May 15, 1934.　　　　　J. H. FULMER　　　　　1,958,661
HOT PLATE DRIER FOR CURING VEGETATION
Filed March 1, 1933　　　2 Sheets-Sheet 1
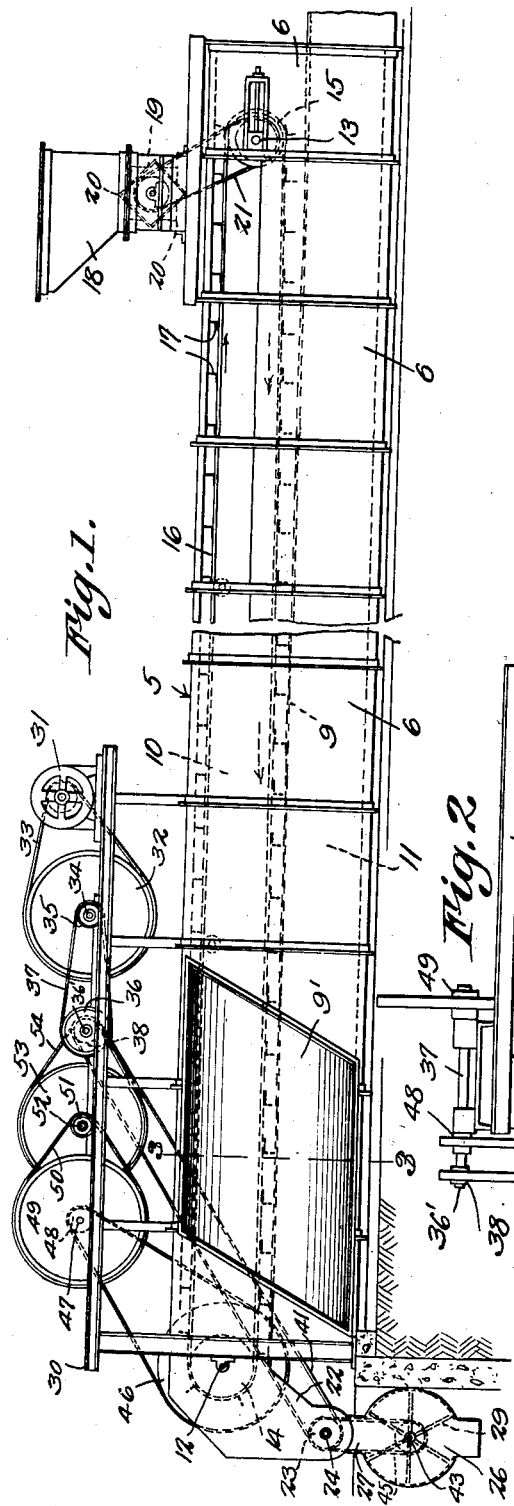
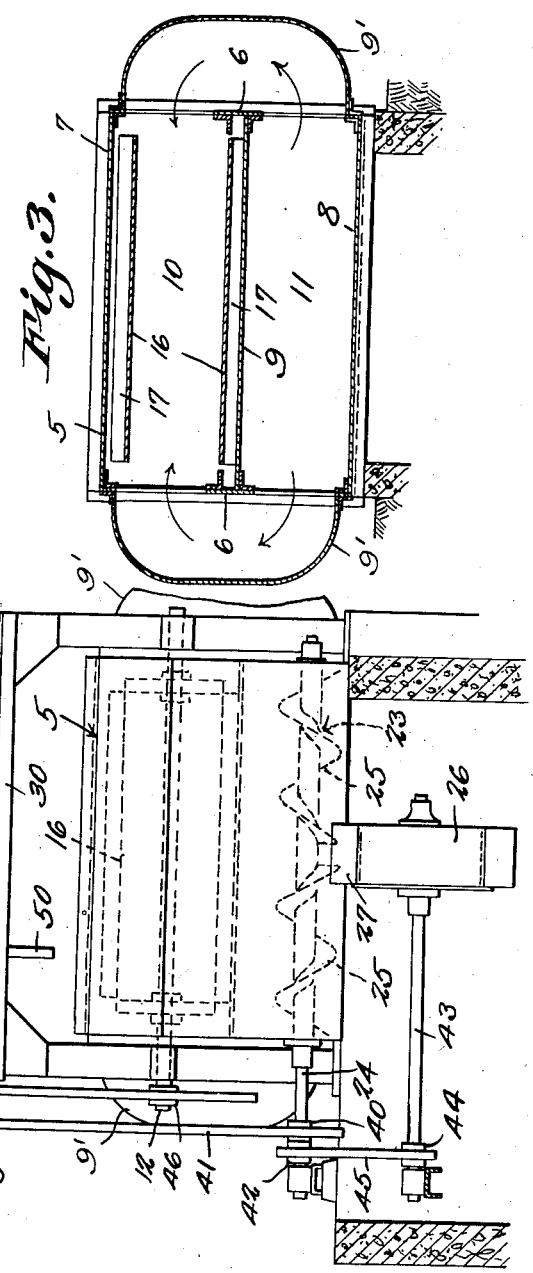
J. H. Fulmer
Inventor
By C. A. Snow & Co.
Attorneys

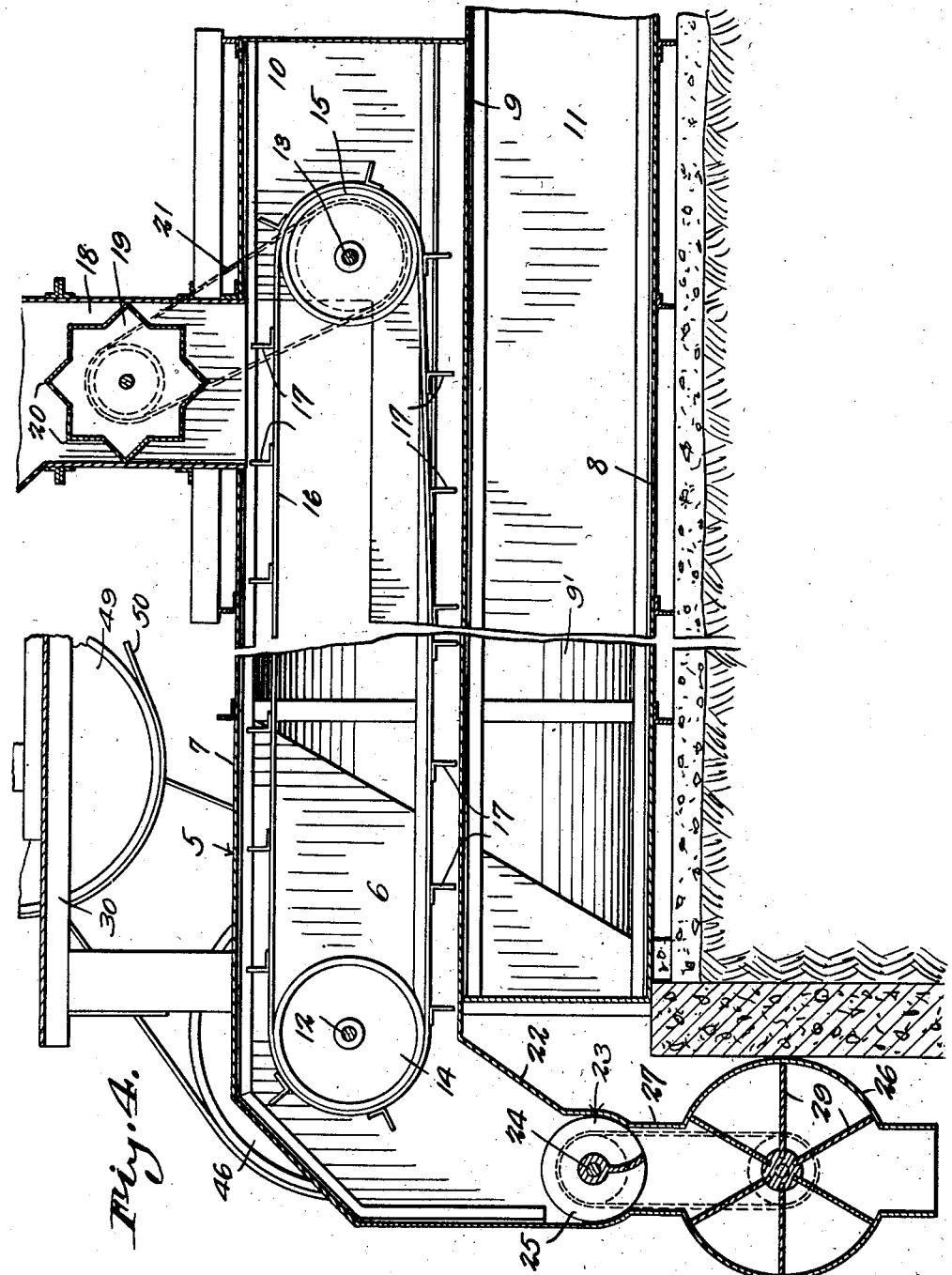

Patented May 15, 1934

1,958,661

UNITED STATES PATENT OFFICE 1,958,661

HOT PLATE DRIER FOR CURING VEGETATION

Joseph Henry Fulmer, Nazareth, Pa.

Application March 1, 1933, Serial No. 659,218

2 Claims. (Cl. 34—13)

This invention relates to a device for drying grains, cut forage, green hay or other free flowing material, such as green forage crops, the primary object of the invention being to provide a machine for artificially curing the material under treatment, by gradually moving the material over a hot plate, forming a part of the device.

An object of the invention is the provision of a curing device of this character, which will automatically feed the material onto a hot plate and gradually convey the material to the discharge end of the machine, the conveyor being arranged in such a manner that the material fed into the machine will not pack and clog the machine, but will maintain the material in a loose condition, so that the heat may pass through the material to accomplish the purpose of the invention.

A still further object of the invention is the provision of means to by-pass the heat from the lower longitudinal passageway of the machine to the curing chamber, at a point spaced from the discharge end of the machine thereby eliminating any possibility of the hot air retarding the discharge of the material from the machine.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a machine constructed in accordance with the invention.

Figure 2 is a front elevational view of the machine.

Figure 3 is a sectional view taken on line 3—3 of Figure 1.

Figure 4 is an enlarged longitudinal sectional view through the machine.

Referring to the drawings in detail, the body portion of the device is indicated generally by the reference character 5, the body portion being elongated in construction and including side walls 6, a top wall 7 and a bottom 8. Walls 6 are open throughout a portion of the length thereof, or at points near the feed end of the body portion, so that the heat may pass from the body portion, after it has passed through the machine and accomplished the curing operation.

Disposed within the body portion and extended throughout the length thereof, is a plate 9 that divides the body portion into an upper curing chamber 10 and a lower heat duct 11, the heat duct 11 being in communication with a suitable source of hot air supply not shown, so that hot air may be directed to the heat duct to heat the plate.

Near the discharge end of the body portion, are lateral ducts 9' that establish communication between the heat duct, and the curing chamber 10, so that the heat passing through the heat duct, may be directed to the curing chamber, at a point in spaced relation with the discharge end of the body portion, so that the heat passing from the heat duct to the curing chamber, will not interfere with the discharge of the material, after it has been properly treated and cured.

The reference character 12 designates a shaft extending transversely of the curing chamber 10, at the discharge end thereof, while the reference character 13 designates a shaft mounted near the feed end of the body portion. These shafts 12 and 13 support the pulleys 14 and 15 respectively, over which pulleys the endless conveyor 16 operates.

The endless conveyor 16 is in the form of a belt, to which the conveyor bars 17 are secured, the conveyor bars extending transversely of the endless conveyor, so that they will contact with the material under treatment, to carry the material over the plate 9, which has been heated to the desired temperature, by the heat passing through the heat duct 11, subjecting the material to such heat as to properly cure the material.

As clearly shown by Figure 4 of the drawings, the pulley 15 is of a diameter less than the diameter of the pulley 14, to the end that the conveyor bars 17 operate a greater distance from the plate 9, at the feed end of the body portion, than they do at the discharge end of the body portion, so that the material will not be packed at the feed end of the body portion, nor will the material act to clog the machine.

At the feed end of the body portion, is a hopper 18, into which the material under treatment, is fed, the hopper being in communication with the feed end of the curing chamber, as clearly shown by Figure 4 of the drawings.

Operating within the hopper 18, is a rotary feeder 19, which is provided with a plurality of sharp edges 20 that move into close engagement with the walls of the hopper, so that the material will be fed into the machine in predetermined quantities, to insure the operation of the machine.

The feeder 19 is rotated by means of the belt 21 which operates over a pulley disposed on one end of the shaft that supports the rotary feeder. This belt 21 moves over a pulley mounted on the shaft 13, which shaft receives its motion by the movement of the endless conveyor 16, operating within the curing chamber.

The discharge end of the curing chamber, extends downwardly as at 22, where it is slightly curved, providing a housing for the conveyor 23, which embodies a shaft 24, and oppositely disposed worms 25 having their inner ends spaced apart to direct material into the housing 26, supported directly thereunder, the housing 26 being in communication with the curing chamber 10 and extension 22, through the pipe 27.

A valve member indicated by the reference character 28, operates in the housing 26, and embodies a plurality of spaced blades 29, between which the material passes, after it has moved over the conveyor 23.

Supported above the discharge end of the body portion, is a frame 30 on which the motor 31 is mounted, the motor 31 transmitting motion to the pulley 32, through the belt 33. The shaft 34 which supports the pulley 32, is supplied with a substantially small pulley 35 that transmits motion to the pulley 36, through the belt 37.

The shaft 36' which supports the pulley 36, also supports a small pulley indicated at 38, which in turn transmits movement to the conveyor shaft 24, through the pulley 40 and belt 41.

Shaft 24 is also provided with a substantially small pulley 42 that transmits motion to the shaft 43, through the pulley 44 and belt 45, the shaft 43 providing the support for the valve 28 which rotates to discharge material from the device.

Rotary movement is transmitted to the endless conveyor 16 through the medium of the pulley 46 mounted on one end of the shaft 12, the pulley 46 receiving motion from the shaft 47, pulleys 48 and 49, and belt 50. The belt 50, moves over the pulley 51 mounted on one end of the shaft 52, that carries the substantially large pulley 53.

Movement is transmitted to the pulley 53, through the belt 54, that operates over a pulley carried at one end of the shaft 36'.

In the operation of the device, the material to be treated, is thrown into the hopper 18, from where the material passes onto the conveyor 23, which carries the material to the bottom of the curing chamber, where the conveyor bars grip the material, and gradually move the material over the hot plate 9.

As the heat passes through the material, the material is artificially cured.

It will of course, be understood that the endless conveyor operates at such a rate of speed that when the material reaches the discharge end of the curing chamber, it will have been properly treated.

The material now falls into the downwardly extended end of the curing chamber, and is fed to the valve 28, by the conveyor 24.

The material now passes from the valve housing 26, into a suitable carrier, or other place of deposit.

Having thus described the invention what is claimed is:

1. A device for curing grain, comprising a body portion, including a curing chamber, an endless conveyor operating in the curing chamber, members on the endless conveyor for engaging the material under treatment, and moving the material through the curing chamber, said members adapted to scrape the bottom of the curing chamber near the discharge end of the curing chamber, and said members operating in spaced relation with the bottom of the curing chamber at the feed end of the curing chamber.

2. A device for curing green vegetation, comprising a body portion, said body portion including a curing chamber, a pulley mounted at each end of the curing chamber, an endless conveyor operating over the pulley and adapted to move material through the curing chamber, one of the pulleys being of a diameter less than the diameter of the other pulley, whereby the conveyor operates in spaced relation with the bottom of the curing chamber throughout a portion of the run of the endless conveyor.

JOSEPH HENRY FULMER.